(No Model.)

W. A. KEARNEY & J. G. DAVIS.
CAR BRAKE.

No. 250,258. Patented Nov. 29, 1881.

WITNESSES:
W. W. Hollingsworth
W. Ready

INVENTOR:
Wm. A. Kearney
J. G. Davis
BY
ATTORNEYS.

UNITED STATES PATENT OFFICE.

WILLIAM AGUSTUS KEARNEY AND JOSEPH GEORGE DAVIS, OF LOGANSPORT, INDIANA.

CAR-BRAKE.

SPECIFICATION forming part of Letters Patent No. 250,258, dated November 29, 1881.

Application filed October 24, 1881. (No model.)

*To all whom it may concern:*

Be it known that we, WM. AGUSTUS KEARNEY and JOSEPH GEORGE DAVIS, of Logansport, in the county of Cass and State of Indiana, have invented a new and useful Improvement in Car-Brakes; and we do hereby declare the following to be a full, clear, and exact description of the same, reference being had to the accompanying drawings, in which—

Figure 1:
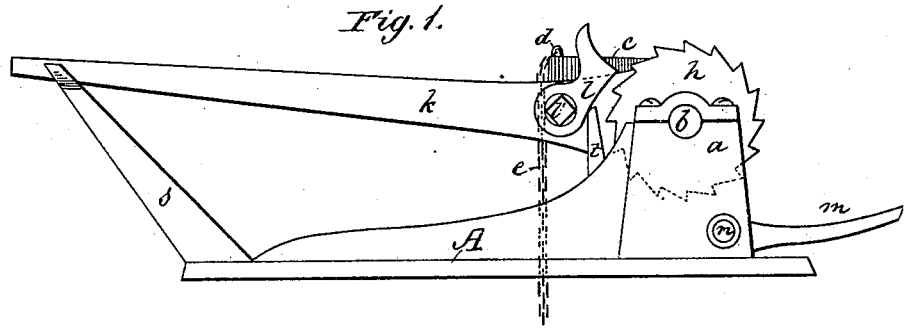
Figure 2:
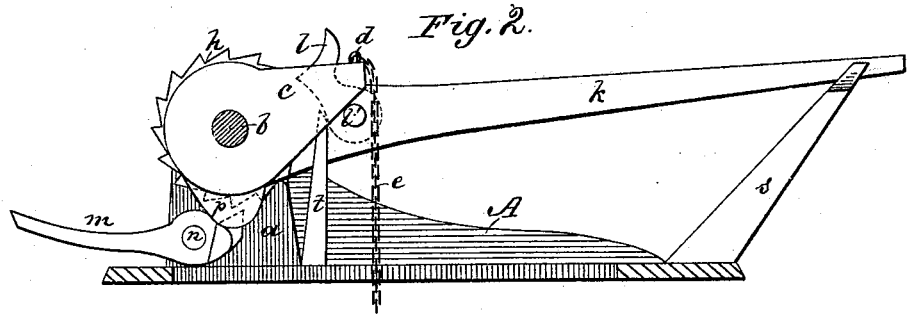
Figure 3:
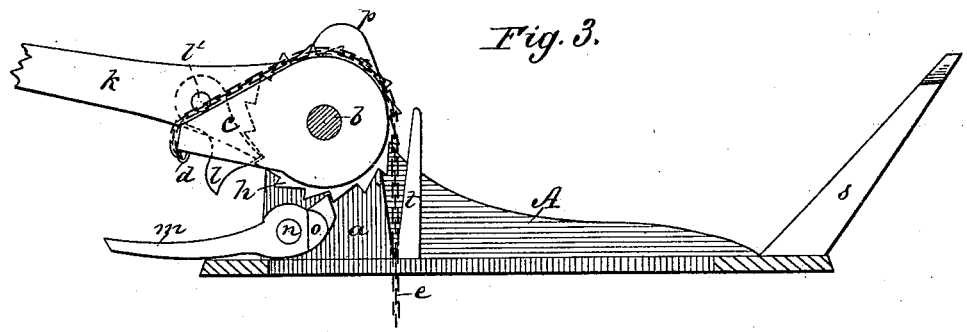

Figure 1 is a side elevation of our improved car-brake with the brake off on the ratchet-wheel side of the brake. Fig. 2 is a similar view of the opposite side of the car-brake, partly in section; and Fig. 3 is a side elevation of the same, showing the brake applied.

Our invention relates to improvements in car-brakes; and it consists in the peculiar construction and arrangement of the parts, as hereinafter more fully set forth.

In the accompanying drawings, A represents a frame for supporting our improved devices for operating a car-brake, which frame is secured to the top of a car near its end.

In the upper ends, $a\,a$, of the sides of the frame A is journaled the axle $b$, carrying the cam $c$, secured to the axle, and having a pin, $d$, at its end, to which the brake-chain $e$ is attached. A part of the axle $b$ is squared and passes through a square central hole in a ratchet-wheel, $h$, whereby the ratchet-wheel and axle are fastened to each other and revolve together, and at the same time the ratchet-wheel may be removed from the axle when desired.

$k$ represents the brake-lever, having one end enlarged and provided with a central orifice, through which the axle $b$ passes, the inner end of the brake-lever, journaled on the axle $b$, lying between the ratchet-wheel $h$ and cam $c$. The brake-lever $k$ is loose on the axle $b$ and free to turn on it in either direction.

$l$ represents a pawl pivoted to one side of the brake-lever $k$, and adapted to engage with the teeth of the ratchet-wheel $h$, and revolve the ratchet-wheel and axle, and the cam $c$, secured thereto, when the lever is revolved forward, the pawl riding over the teeth of the ratchet-wheel in the backward movement of the brake-lever without turning it.

$m$ represents a pawl journaled on a horizontal rod, $n$, passing through one of the sides $a$ of the frame below the ratchet-wheel, the pawl $m$ being adapted to ride over the teeth of the ratchet-wheel $h$ in the forward movement of the brake-lever and engage with a tooth of the ratchet-wheel and prevent it from turning when the brake has been applied. The rod $l'$, on which the pawl $l$ is journaled, is extended laterally, so as to act as a stop to the movement of the cam $c$. The pawl $m$ is provided with a cam, $o$, on its inner face, and the enlarged inner end of the brake-lever $k$ is also provided with a cam, $p$, adapted to engage with the cam $o$ in the revolution of the brake-lever $k$.

$s$ represents a standard or support for the brake-lever, secured to the frame near its rear end, on which the outer end of the brake-lever rests when the brake is not applied.

$t$ represents a vertical rod secured to one side of the frame under the pawl $l$, the function of which is to release the pawl $l$ from the ratchet-wheel in the backward movement of the brake-lever, the pawl striking against the upper end of the rod $t$, which releases it from engagement with the ratchet-teeth.

The operation of our improved car-brake is as follows: Suppose it is necessary to apply the brakes; the brake-lever, resting in its support in the rear end of the frame, is thrown forward, the pawl $l$, pivoted to the brake-lever, engaging with the teeth of the ratchet-wheel, and turning it and the axle and the cam $c$, carrying the brake-chain, the pawl $m$ riding over the teeth of the ratchet-wheel when the latter is moving in the same direction as the brake-lever, or forward, but preventing the ratchet-wheel from moving in the opposite direction, whereby the brake is applied and securely held in place. When it is desired to let off the brake the brake-lever is swung backward, the pawl $l$ riding over the ratchet-teeth until the cam $p$ on the brake-lever engages with the cam $o$ on the pawl $m$, disengaging the latter from the ratchet-wheel, the pawl $l$ also being thrown out of engagement with the ratchet-wheel by coming in contact with the end of the rod $t$, when the strain on the brake-chain will automatically turn the axle-cam $c$ and ratchet-wheel, and the brake is let off.

This construction is extremely simple, cheap, and effective, and can be readily and quickly operated with one hand on a train of cars by a brakeman running along the top of the train.

The standard or support s, for the brake-lever when the brake is not applied, consists of a thin piece of metal about one and a half inch wide, cast on the frame and making an angle of about forty-five degrees therewith, and lying in front of the ratchet-wheel and directly under the brake-lever, and of the right height to stop the lever simultaneously with the release of the pawls. The rod $l'$, by means of which the pawl $l$ is journaled to the brake-lever $k$, extends laterally, as before described, so that when the brake-lever is at rest in its support $s$ and the brake not applied the cam $c$ rests on the rod $l'$, which journals the pawl $l$ to the brake-lever $k$. When the brake-lever is thrown over or the brake applied the rod $l'$ is kept behind the cam $c$. When the lever is thrown back, so as to rest in its support $s$, or the brake opened, the cam will make part of a revolution and strike the protruding end of the rod $l'$, which thus serves the double purpose of a journal for the pawl and a stop for the cam, and also as a means for moving the cam in applying the brake.

We claim as our invention—

1. The combination, with the cam $c$ and ratchet-wheel $h$, fast on the axle $b$, and brake-lever $k$, pivoted loosely on the axle and provided with the cam $p$, of the pawl $l$, pivoted to the brake-lever, and pawl $m$, provided with the cam $o$, substantially as described, and for the purpose set forth.

2. The combination, with the cam $c$ and ratchet-wheel $h$, fast on the axle $b$, of the pawl $l$, journaled to the brake-lever, and rod $l'$, serving the double purpose of a journal for the pawl and a stop for the cam, substantially as described.

3. The combination of the frame A, provided with the sides $a$ and standard $s$, axle $b$, journaled in the frame, cam $c$, provided with a brake-chain, and ratchet-wheel $h$, both fast on the axle, brake-lever $k$, loose on the axle, and provided with the pawl $l$ and cam $p$, rod $t$, and pawl $m$, provided with the cam $o$, substantially as described, and for the purpose set forth.

In testimony that we claim the above we have hereunto subscribed our names in the presence of two witnesses.

WM. AGUSTUS KEARNEY.
JOSEPH GEORGE DAVIS.

Witnesses:
WM. POWELL,
GEO. W. FENDER.